(12) United States Patent
Lin

(10) Patent No.: US 6,873,128 B2
(45) Date of Patent: Mar. 29, 2005

(54) DIRECT CURRENT MOTOR CONTROL DEVICE OF WATER HEATER

(76) Inventor: Kung Huei Lin, No. 5, Lane 35, Ta-Fu Rd., Shen Kang Hsiang, Taichung Hsien (TW)

( * ) Notice: Subject to any disclaimer, the term of this patent is extended or adjusted under 35 U.S.C. 154(b) by 15 days.

(21) Appl. No.: 10/187,901

(22) Filed: Jul. 3, 2002

(65) Prior Publication Data

US 2004/0021436 A1 Feb. 5, 2004

(51) Int. Cl.$^7$ ................................................. H02K 7/10
(52) U.S. Cl. ...................... 318/362; 318/437; 318/138; 318/254; 318/439; 388/800
(58) Field of Search ................................. 318/362, 437, 318/138, 254, 439, 432; 388/800

(56) References Cited

U.S. PATENT DOCUMENTS 5,237,911 A * 8/1993 Aebi ............................ 99/287

6,369,538 B1 * 4/2002 Youn et al. .................. 318/362

* cited by examiner

Primary Examiner—Karen Masih
(74) Attorney, Agent, or Firm—Browdy and Neimark, P.L.L.C.

(57) ABSTRACT

A DC motor control device of a water heater includes a fanner control system, a rotation speed detection circuit, and a micro-processing unit. The fanner control system has a DC motor and a control circuit unit. The rotation speed detection circuit is connected to the DC motor for detecting the rotation speed of the DC motor. The micro-processing unit is connected to the output terminals of the rotation speed detection circuit. The output terminals of the micro-processing unit are connected to the fanner control system. The micro-processing unit is to process outputs of the rotation speed detection circuit and then output a low DC voltage to drive the DC motor, thereby having an optimal rotation speed.

3 Claims, 4 Drawing Sheets

US 6,873,128 B2

DIRECT CURRENT MOTOR CONTROL DEVICE OF WATER HEATER

BACKGROUND OF THE INVENTION

1. Field of the Invention

The present invention relates to a direct current (DC) motor control device of a water heater and, more particularly, to a control device, which adopts a DC motor having a large torque and utilizes a modified low-cost phase control method to change the output voltage.

2. Description of the Prior Art

As shown in FIGS. 1 and 2, a conventional motor of a water heater includes a fanner control system 11, a rotation speed detection circuit 12, and a micro-processing unit 13. The fanner control system 11 includes an alternating current (AC) motor 111 and a control unit 112. The control unit 112 is connected to the AC motor 111. The control unit 112 includes a first control circuit 1121 and a second control circuit 1122.

The first control circuit 1121 consists of a resistor R11 and a capacitor C11. The first control circuit 1121 is used to filter out noises from the input AC voltage source Vs1.

The second control circuit 1122 consists of resistors R12~R15, capacitors C12 and C13, an inductor L1, a transistor Q1, a bi-directional thyristor (semiconductor-controlled rectifier) TR1, and a photo coupler PC1. The photo coupler PC1 is principally used to isolate the AC source from the DC source so as to prevent interferences and short circuits therebetween. The photo coupler PC1 is to conduct the bi-directional thyristor TR1.

The input of the rotation speed detection circuit 12 is connected to the AC motor 111 of the fanner control system 11, and to detect the rotation speed of the AC motor 111.

The input of the micro-processing unit 13 is connected to the rotation speed detection circuit 12, and the output thereof is connected to the second control circuit 1122 of the control unit 112. The micro-processing unit 13 is used to process outputs of the rotation speed detection circuit 12 and then output a control signal to the second control circuit 1122.

The way of operation for the above circuit is described below. The rotation speed of the AC motor 111 of the fanner control system 11 is transferred to the micro-processing unit 13 for being processed after being wave-shaped and buffered by the rotation speed detection circuit 12. The micro-processing unit 13 then outputs a signal to the second control circuit 1122 to conduct the transistor Q1 and to drive the photo coupler PC1, and then to conduct the bi-directional thyristor TR1 so that the corresponding phase control can be achieved. The first control circuit 1121 is also matched to drive the AC motor 111 to have the optimal rotation speed.

Although the costs of an AC motor and a matching control circuit are low, the AC motor used in the fanner control system has the disadvantage of small torque. Moreover, the rotation speed is limited by the frequency and pole number, and is difficult to increase the torque and the rotation speed. Contrarily, a DC motor used in the fanner control system has the advantage of large torque. Moreover, the rotation speed of the DC motor is not limited by the frequency. However, the costs of the DC motor and its matching control circuit are much higher than its AC counterpart.

SUMMARY OF THE INVENTION

In order to overcome the above disadvantages of a conventional motor control device, the primary object of the present invention is to provide a control device, which adopts a large torque DC motor and utilizes a modified low-cost phase control method to change the output voltage, thereby having performances of large torque, high rotation speed, and low cost.

To achieve the above object, a DC motor control device of a water heater of the present invention includes a fanner control system, a rotation speed detection circuit, and a micro-processing unit. The fanner control system has a DC motor and a control circuit unit. The DC motor is connected to the control circuit unit. The control circuit unit includes a first control circuit, a second control circuit, and a third control circuit. The first control circuit is connected to the third control circuit. The input terminals of the third control circuit are connected to the second control circuit, and output terminals thereof are connected to the DC motor. The rotation speed detection circuit is connected to the DC motor of the fanner control system. The micro-processing unit is connected to the output terminal of the rotation speed detection circuit. The output terminal of the micro-processing unit is connected to the second control circuit.

The various objects and advantages of the present invention will be more readily understood from the following detailed description when read in conjunction with the appended drawings, in which:

DETAILED DESCRIPTION OF THE PREFERRED EMBODIMENTS

Figure 1:
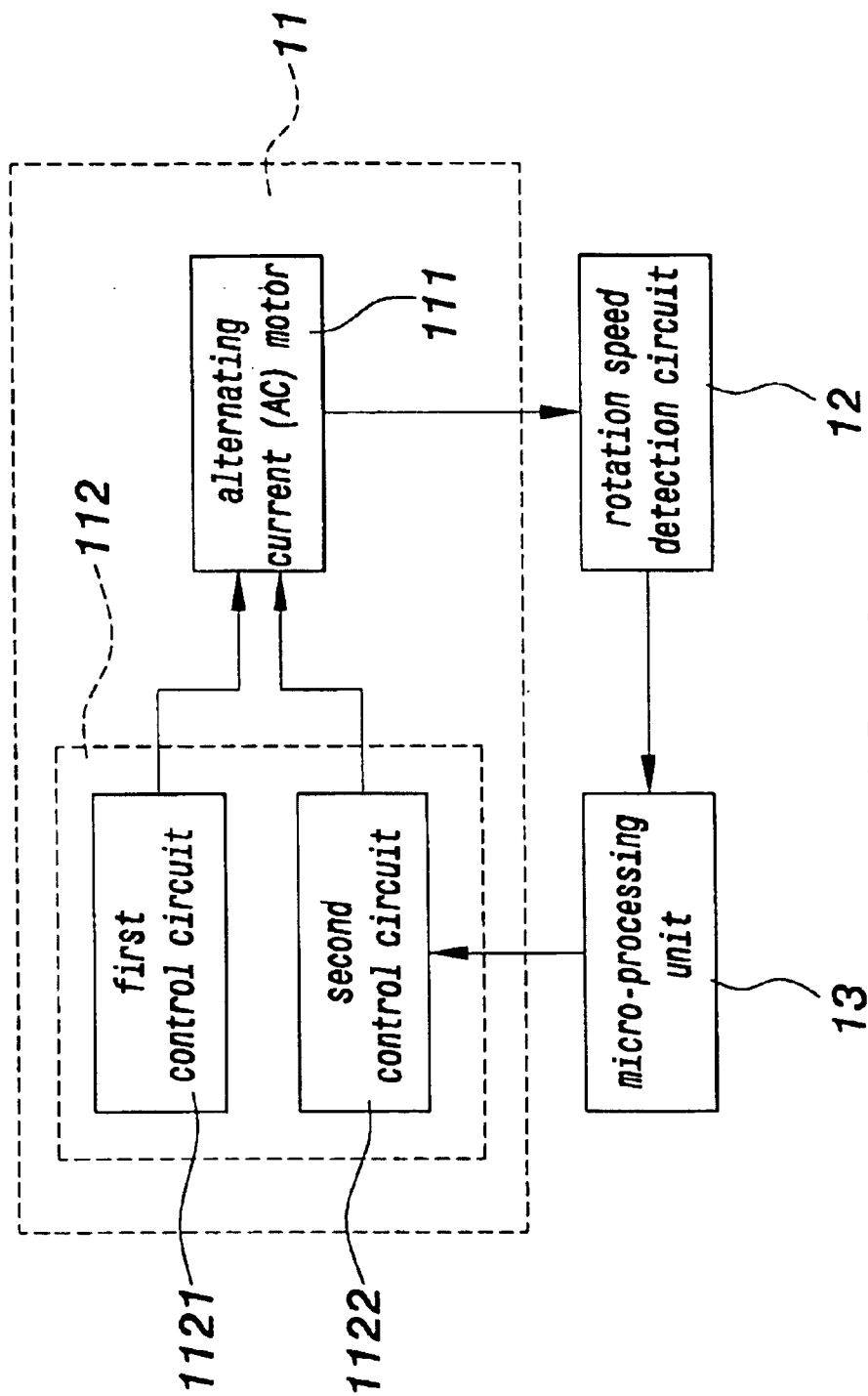
FIG. 1 is a circuit block diagram of a conventional motor control device of a water heater.
Figure 2:
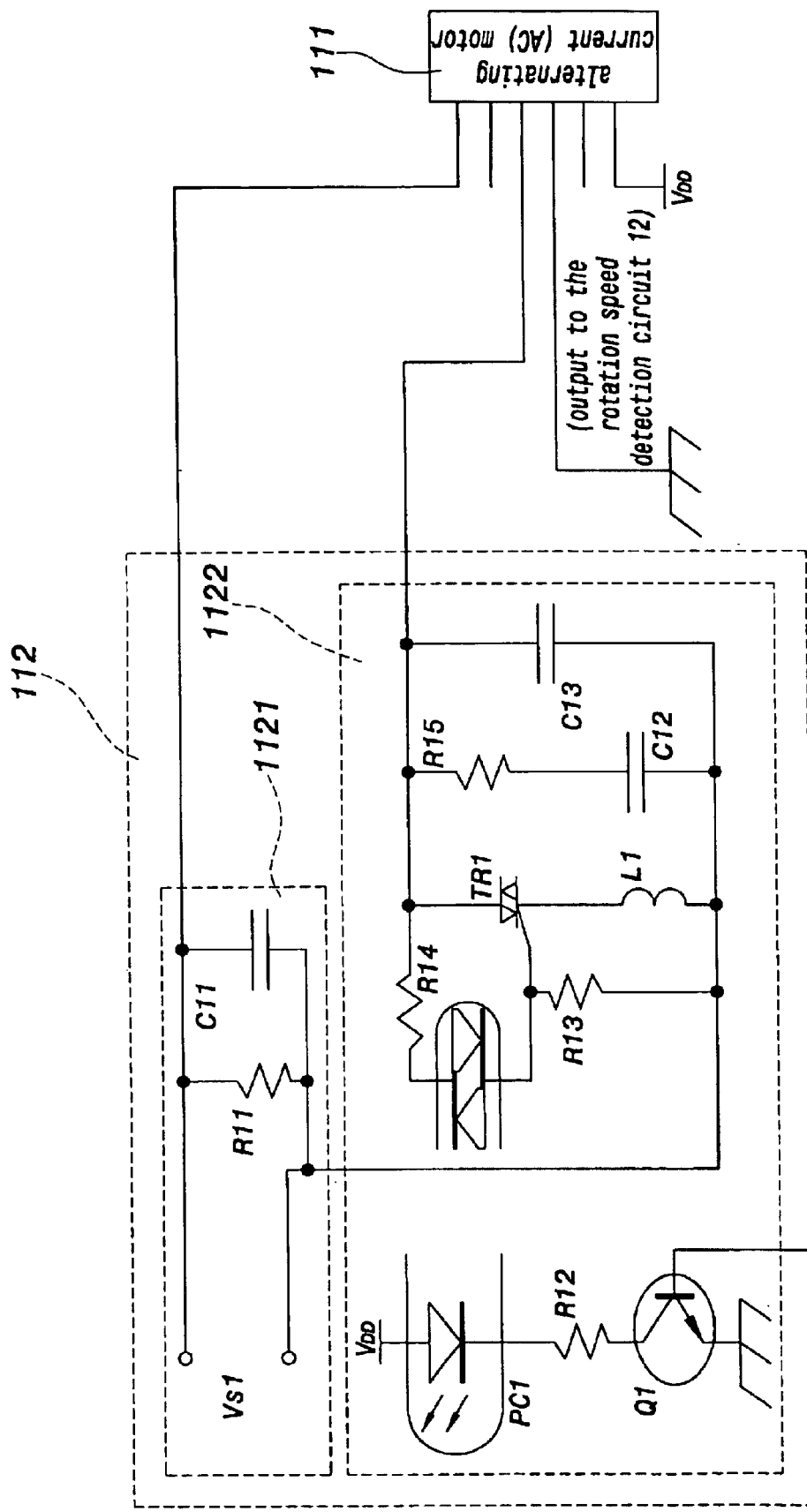
FIG. 2 is a circuit diagram of a conventional fanner control system.
Figure 3:
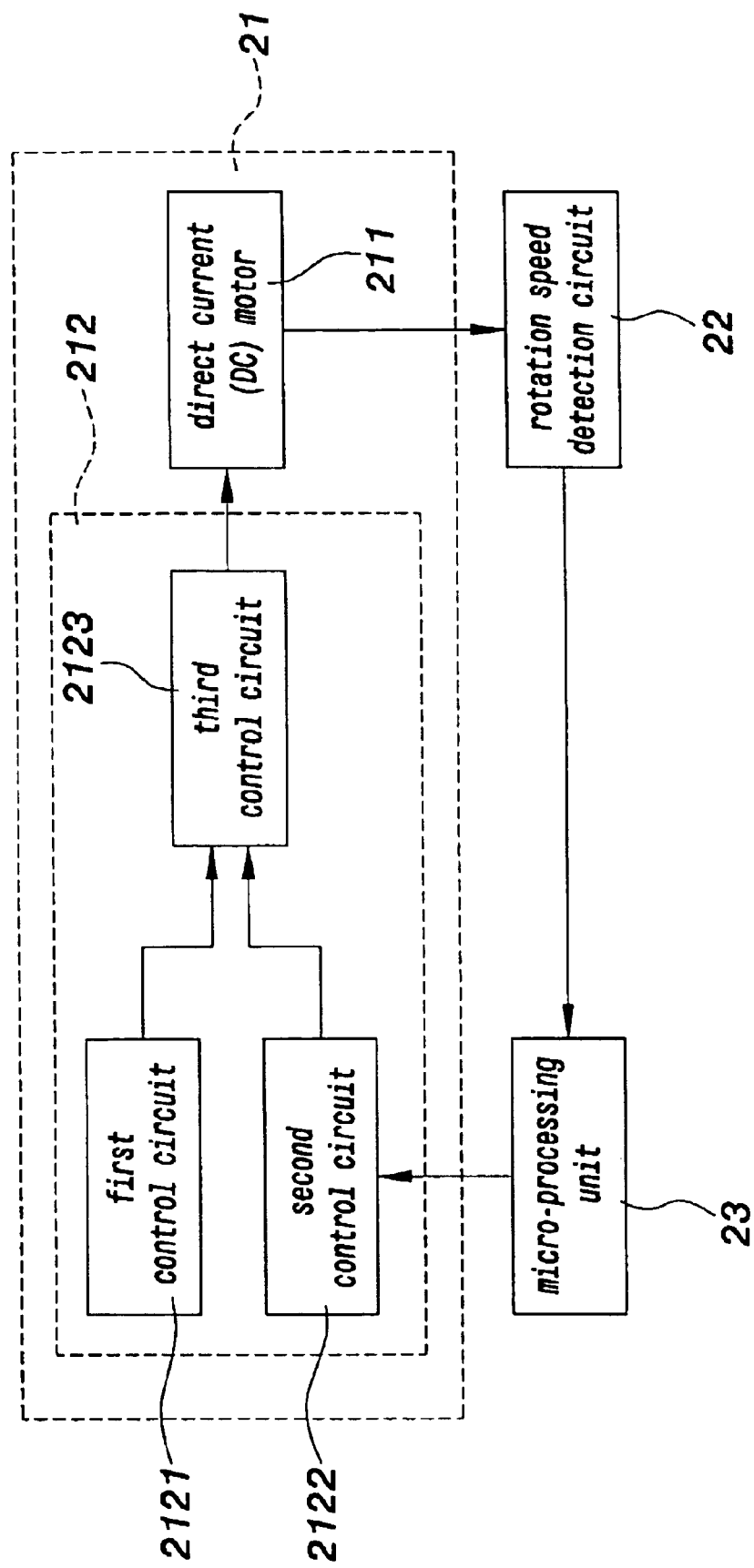
FIG. 3 is a circuit block diagram of the present invention.
Figure 4:
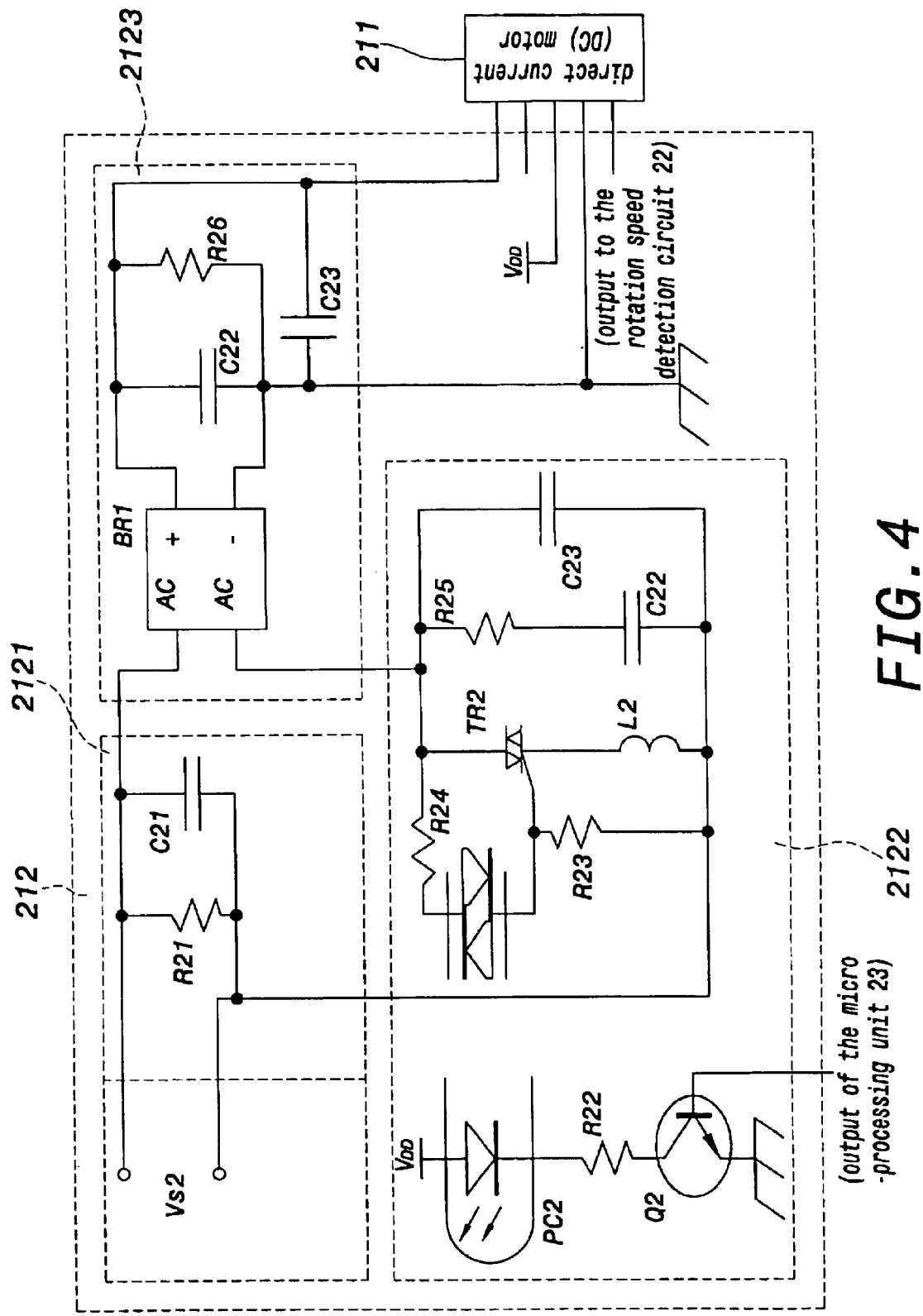
FIG. 4 is a circuit diagram of a fanner control system of the present invention.

As shown in FIGS. 3 and 4, a DC motor control device of a water heater of the present invention includes a fanner control system 21, a rotation speed detection circuit 22, and a micro-processing unit 23. The fanner control system 21 includes a DC motor 211 and a control circuit unit 212. The control circuit unit 212 is connected to the DC motor 211. The control circuit unit 212 includes a first control circuit 2121, a second control circuit 2122, and a third control circuit 2123.

The first control circuit 2121 consists of a resistor R21 and a capacitor C21 and is for filtering out noises from the AC voltage source Vs2.

The second control circuit 2122 consists of resistors R22~R25, capacitors C22 and C23, an inductor L2, a transistor Q2, a bi-directional thyristor TR2, and a photo coupler PC2. The photo coupler PC2 is mainly used to isolate the AC source from the DC source for the sake of preventing the interference and short circuit between the AC and Dc source. The photo coupler PC2 is also used to conduct the bi-directional thyristor TR2 for the purpose of phase control.

The third control circuit 2123 includes a resistor R26, capacitors C22 and C23, and a rectifier BR1. The two input terminals of the rectifier BR1 are connected to the output terminals of the first control circuit 2121 and the second control circuit 2122, respectively. The two output terminals (+) and (−) of the rectifier BR1 are shunted with the resistor R26 and the capacitors C22 and C23. The resistor R26 along with the capacitors C22 and C23 is functionally equivalent as a filter, which has output terminals connected to the DC motor 211. The third control circuit 2123 is for rectifying and filtering the output AC voltages of the first control circuit 2121 and the second control circuit 2122 so as to output a low DC voltage to the DC motor 211.

The input of the rotation speed detection circuit 22 is connected to the DC motor 211 of the fanner control system 21, and is used to detect the rotation speed of the DC motor 211 for wave-shaping and buffering operations.

The input terminals of the micro-processing unit 23 are connected to the rotation speed detection circuit 22, and the output terminals thereof are connected to the second control circuit 2122. The micro-processing unit 23 is used to process outputs of the rotation speed detection circuit 22 and then to output a corresponding control signal to the second control circuit 2122.

The rotation speed of the DC motor 211 of the fanner control system 21 is transferred to the micro-processing unit 23 for being processed after wave-shaping and buffering operations performed by the rotation speed detection circuit 22. The micro-processing unit 23 then outputs a signal to the second control circuit 2122 to conduct the transistor Q2 and then to drive the photo coupler PC2 to conduct the bi-directional thyristor TR2, all for the purpose of phase control. Through rectification of the rectifier BR1 and filtering of the resistor R26 along with the capacitors C22 and C23, the first control circuit 2121 is set to output a low DC voltage to drive the DC motor 211, letting the DC motor 211 have an optimal rotation speed.

To sum up, the DC motor control device of a water heater of the present invention can be with performances of large torque, high rotation speed, and low cost.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A DC motor control device of a water heater, comprising:

a fanner control system having a DC motor and a control circuit unit connected to said DC motor, said control circuit unit having a first control circuit for filtering out noises from an input AC source, a second control circuit for phase control of external signals, and a third control circuit having input terminals respectively connected to said first control circuit and said second control circuit and output terminals connected to said DC motor; for rectifying and filtering a first AC voltage outputted from said first control circuit and a second AC voltage outputted from said second control circuit so as to provide a DC voltage to drive said DC motor and control a rotation speed of said DC motor;

a rotation speed detection circuit being connected to said DC motor of said fanner control system for detecting the rotation speed of said DC motor; and a micro-processing unit connected to said rotation speed detection circuit and said second control circuit for processing outputs from said rotation speed detection circuit and outputting a control signal to drive said second control circuit to output the second AC voltage.

2. The DC motor control device of a water heater as claimed in claim 1, wherein said third control circuit has a rectifier having input terminals thereof connected to output terminals of said first control circuit and said second control circuit, and output terminals thereof said connected to a filter having output terminals connected to said DC motor.

3. The DC motor control device of a water heater as claimed in claim 1, wherein said second control circuit consists of a photo coupler and a bi-directional thyristor.

* * * * *